June 25, 1963

M. ESKENAZI 3,095,063

GEAR UNITS

Filed Dec. 27, 1960

Inventor
MAURICE ESKENAZI
By Morris & Bateman
Attorneys

United States Patent Office 3,095,063
Patented June 25, 1963

---

3,095,063
GEAR UNITS
Maurice Eskenazi, London, England, assignor to
David Brown Industries Limited
Filed Dec. 27, 1960, Ser. No. 78,605
Claims priority, application Great Britain Jan. 8, 1960
7 Claims. (Cl. 184—6)

The invention relates to gear units and more particularly to gear units in which the gears run partly immersed in oil and one or more shafts extend downwards from the casing.

It is usual to provide such a unit with an annular oil seal which makes rubbing contact with the outside diameter of the shaft. However, such an oil seal is liable to seepage through wear due to contact with a moving part, and loss of oil from the gear casing could result in destruction of the gears or in the event of the gear unit operating with apparatus in which food or chemicals are being treated, loss of oil could result in contamination of the food or chemicals.

According to the invention, a gear unit comprises a casing, a shaft rotatably mounted within and extending downwardly through the base of the casing, a gear mounted on the shaft within the casing and partly immersed in oil, an annular recess formed between the shaft and the gear and open at its lower end, the upper end of the annular recess being above the oil level, and a tubular shroud surrounding the shaft and extending from the base of the casing into the recess to a plane above the oil level. The tubular shroud may be either integral with the casing or it may be removably mounted within the casing. Preferably, the shroud is removably mounted within the casing by means of a sealing ring of resilient material engaging with an annular groove formed in the outside diameter of a boss or sleeve forming part of the casing and surrounding the shaft. Preferably, also, the sealing ring is bonded to the shroud.

A preferred embodiment of the invention will now be described, by way of example only, with reference to the accompanying drawings of which:

Figure 1:
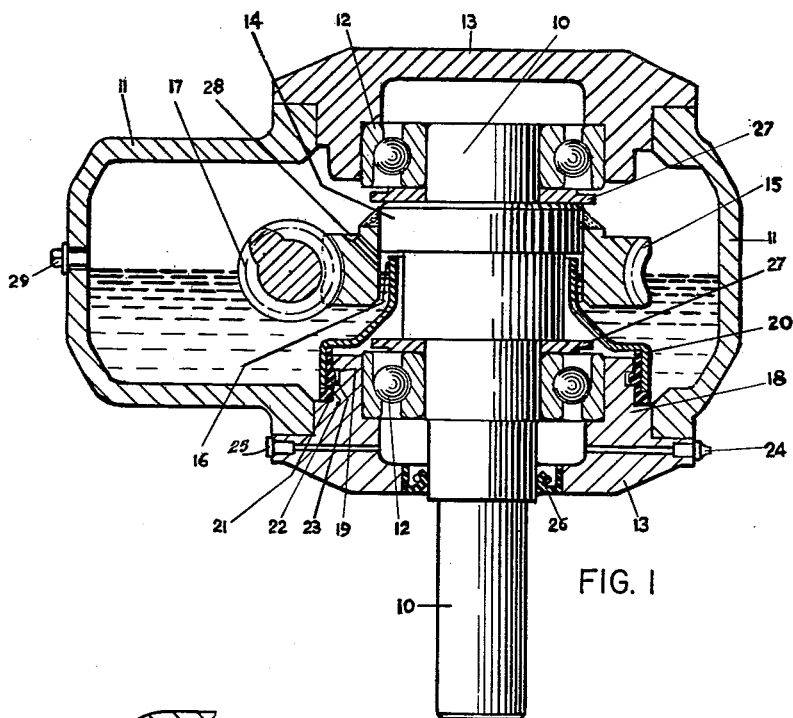
FIG. 1 is a sectional elevation of a gear unit according to the invention.
Figure 2:
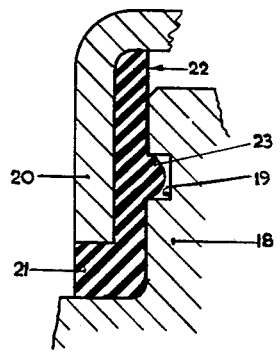
FIG. 2 is a sectional view of a detail, on an enlarged scale.

Referring now to the drawing, a worm reduction unit comprises an output shaft 10 rotatably mounted in a casing 11 by means of upper and lower bearings 12, 12 used within respective cover plates 13, 13. A collar 14 integral with the shaft 10 has a wormwheel 15 secured thereto the bore of the wormwheel extending downwards beyond the lower edge of the collar 14 thus forming an annular recess 16 between the shaft 10 and the wormwheel 15. The wormwheel meshes with a driving worm 17, and the gears run partly immersed in oil, the level of which coincides with the horizontal plane passing through the worm axis. On the lower cover plate 13 there is formed an upwardly extending boss 18 around the periphery of which there is an annular groove 19. A tubular shroud 20 is stepped so that the diameter of its upper end is smaller than that of its lower end, and said shroud has bonded to its lower end a sealing ring 21 of synthetic rubber, said ring having a cylindrical bore 22 with an inwardly projecting lip 23. The cylindrical bore 22 engages with the outside diameter of the boss 18, and the lip 23 engages with the groove 19 (see FIG. 2). The shroud 20 is thus properly easily located on boss 18 by coacting means, lip 23 and groove 19, on the shroud and boss. This structure provides a removable mount for shroud 20 on boss 19 with resilient ring 21 forming a seal at the mounting position. The shroud 20 extends upwards into the recess formed between the wormwheel 15 and the shaft 10 to a plane above the level of oil within the casing 11. A nipple 24 is fitted in the lower cover plate 13 to enable grease to be pumped into the lower bearing 12. The pressure of grease within said bearing is limited by a relief valve 25 also fitted in the lower cover plate 13. A conventional oil seal 26 prevents the leakage down the shaft 10 of any grease from the lower bearing 12, and a washer 27 impedes the escape of grease into the shroud 20 from said bearing. A hole 28 is drilled in the wormwheel to connect the air space within the shroud 20 with the air space within the rest of the casing 11. The maximum level of oil within the casing 11 is limited by an overflow hole fitted with a screwed closure plug 29.

When the gear unit is in use, with the output shaft 10 extending vertically downwards, oil is withheld from contact with said shaft by means of the shroud 20 which projects above the level of oil. The shroud is, of course, stationary and makes no contact with any moving part, so that the possibility of oil leakage due to wear is obviated. The invention thus contemplates an easily mounted and located shroud on the internal gear casing boss which provides a seal without involving parts manufactured to close tolerances. The function of the hole 28 in the wormwheel 15 is to maintain the same air pressure within the recess 16 and within the rest of the casing 11, and said hole is so located that any oil which inadvertently passes through it into the recess falls on the outside of the shroud 20.

Figure 3:
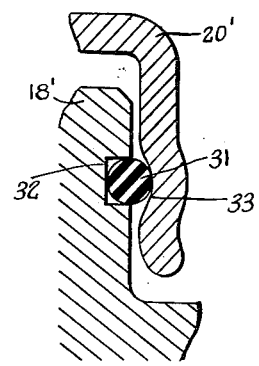
FIG. 3 is a fragmentary section showing a further embodiment wherein an O-ring is interposed between the shroud and the cover plate boss.

Various modifications can be made, for instance, instead of a ring of synthetic rubber being bonded to the lower end of the shroud, a so-called O-ring of synthetic rubber can be accommodated between the shroud and the boss on the lower cover plate, in suitable annular grooves formed in the shroud and the boss. This is shown in FIGURE 3 wherein the resilient O-ring 31 is interposed under radial compression between the boss 18' and shroud 20' with its inner and outer peripheries disposed in annular grooves 32 and 33 respectively.

What I claim is:

1. A gear unit comprising a casing containing oil to a selected level, a shaft rotatably mounted within and extending downwardly through the base of the casing, a gear mounted on the shaft within the casing and forming with said shaft a sub-assembly, said gear being partly immersed in said oil, means providing an annular recess in said shaft and gear sub-assembly, said recess being open at its lower end and generally concentric with said shaft, the upper end of said annular recess being above the oil level, a removable tubular shroud member surrounding the shaft and extending from the base of the casing into the recess to terminate above the oil level, an upwardly extending boss member surrounding said shaft within said casing, and means for mounting and locating said shroud member in sealed relation upon said boss member comprising a resilient ring disposed in sealing relation between the tubular shroud member and the boss member with said locating means being coacting parts on the resilient ring and a least one of said members.

2. A gear unit comprising a casing containing oil to a selected level, a shaft rotatably mounted within and extending downwardly through the base of the casing, a gear mounted on the shaft within the casing and forming with said shaft a sub-assembly, said gear being partly immersed in said oil, means forming an annular recess in said shaft and gear sub-assembly, said recess being open at its lower end and generally concentric with said shaft, the upper end of said annular recess being above the oil level, a removable tubular shroud member surrounding the shaft and extending from the base of the casing into the recess to terminate above the oil level, an upwardly extending boss member surrounding said shaft within the casing, and means for mounting and locating said shroud member in sealed relation upon said boss member comprising a resilient ring disposed in sealing relation between the tubular shroud member and the boss member, a locating lip formed on the resilient ring, and an annular groove in one of said members for receiving said locating lip.

3. A gear unit comprising a casing containing oil to a selected level, a shaft rotatably mounted within and extending downwardly through the base of the casing, a gear mounted on the shaft within the casing and forming with said shaft a sub-assembly, said gear being partly immersed in said oil, means forming an annular recess in said shaft and gear sub-assembly, said recess being open at its lower end and generally concentric with said shaft, the upper end of said annular recess being above the oil level, a removable tubular shroud member surrounding the shaft and extending from the base of the casing into the recess to terminate above the oil level, a bottom cover plate on the casing, an upwardly extending boss member on the cover plate surrounding said shaft, and means for mounting and locating said shroud member in sealed relation upon said boss member comprising a resilient ring disposed in sealing relation between the tubular shroud member and the boss member, a locating lip formed on the resilient ring, and an annular groove in one of said members for receiving said locating lip.

4. A gear unit comprising a casing containing oil to a certain level, a shaft rotatably mounted within and extending downwardly through the base of the casing, a gear mounted on the shaft within the casing and forming with said shaft a sub-assembly, said gear being partly immersed in said oil, means forming an annular recess in said shaft and gear sub-assembly, said recess being open at its lower end and generally concentric with said shaft, the upper end of said annular recess being above the oil level, a removable tubular shroud member surrounding the shaft and extending from the base of the casing into the recess to terminate above the oil level, an upwardly extending boss member surrounding said shaft within the casing, and means for mounting and locating said shroud member in sealed relation upon said boss member comprising a resilient ring bonded to the tubular shroud member and disposed in sealing relation between said shroud member and the boss member, a locating lip formed on the resilient ring, and an annular groove in the boss member for receiving said locating lip.

5. A gear unit comprising a casing containing oil to a certain level, a shaft rotatably mounted within and extending downwardly through the base of the casing, a gear mounted on the shaft within the casing and forming with said shaft a sub-assembly, said gear being partly immersed in said oil, means forming an annular recess in said shaft and gear sub-assembly, said recess being open at its lower end and generally concentric with said shaft, the upper end of the annular recess being above the oil level, a removable tubular shroud member surrounding the shaft and extending from the base of the casing into the recess to terminate above the oil level, a cover plate forming a lower part of the casing, an upwardly extending boss member on the cover plate surrounding said shaft, and means for mounting and locating said shroud member in sealed relation upon said boss member comprising a resilient ring bonded to the tubular shroud member and disposed in sealing relation between said shroud member and the boss member, a locating lip formed on the resilient ring, and an annular groove in the boss member for receiving said locating lip.

6. A gear unit comprising a casing containing oil to a certain level, a shaft rotatably mounted within and extending downwardly through the base of the casing, a gear mounted on the shaft within the casing and forming with said shaft a sub-assembly, said gear being partly immersed in said oil, means forming an annular recess in said shaft and gear sub-assembly, said recess being open at its lower end and generally concentric with said shaft, the upper end of the annular recess being above the oil level, a removable tubular shroud member surrounding the shaft and extending from the base of the casing into the recess to terminate above the oil level, an upwardly extending boss member surrounding said shaft within the casing, and means for mounting and locating said shroud member in sealed relation upon said boss member comprising a resilient ring in sealing relation between the tubular shroud member and the boss member, annular grooves formed in said members, and locating surfaces on the resilient ring coacting with said grooves.

7. A gear unit comprising a casing containing oil to a selected level, a shaft rotatably mounted within and extending downwardly through the base of the casing, a gear mounted on the shaft within the casing and forming with said shaft a sub-assembly, said gear being partly immersed in said oil, means forming an annular recess in said shaft and gear sub-assembly, said recess being open at its lower end and generally concentric with said shaft, the upper end of the annular recess being above the oil level, a removable tubular shroud member surrounding the shaft and extending from the base of the casing into the recess to terminate above the oil level, a cover plate forming a lower part of the casing, an upwardly extending boss member on the cover plate surrounding said shaft, and means for mounting and locating said shroud member in sealed relation upon said boss member comprising a resilient sealing ring in sealing relation between the tubular shroud member and the boss member, annular grooves formed in said members, and locating surfaces on the resilient ring coacting with said gooves.

References Cited in the file of this patent
UNITED STATES PATENTS

| | | |
|---|---|---|
| 2,256,754 | Schmitter et al. | Sept. 23, 1941 |
| 2,524,381 | Froussard | Oct. 3, 1950 |
| 2,581,123 | Merkle | Jan. 1, 1952 |